US006652202B2

(12) United States Patent
Remke et al.

(10) Patent No.: US 6,652,202 B2
(45) Date of Patent: Nov. 25, 2003

(54) DRILL BIT APPARATUS AND METHOD OF MANUFACTURE OF SAME

(75) Inventors: Tony J. Remke, Marengo, IL (US); John Olas, Marengo, IL (US)

(73) Assignee: Quick Turn Manufacturing, LLC, Morengo, IL (US)

( * ) Notice: Subject to any disclaimer, the term of this patent is extended or adjusted under 35 U.S.C. 154(b) by 99 days.

(21) Appl. No.: 09/750,469

(22) Filed: Dec. 28, 2000

(65) Prior Publication Data

US 2001/0031178 A1 Oct. 18, 2001

Related U.S. Application Data

(60) Provisional application No. 60/174,209, filed on Jan. 3, 2000.

(51) Int. Cl.[7] ................................................ B23B 51/02

(52) U.S. Cl. ........................ 408/214; 408/225; 408/227

(58) Field of Search ................................ 408/1 R, 225, 408/223, 214, 227

(56) References Cited

U.S. PATENT DOCUMENTS

| | | | |
|---|---|---|---|
| 430,344 A | | 6/1890 | Hoefle |
| 458,640 A | | 9/1891 | Phillips |
| 1,783,082 A | | 11/1930 | Grosjean |
| 2,358,077 A | | 9/1944 | Koett |
| 2,883,888 A | | 4/1959 | Stewart |
| 3,687,565 A | | 8/1972 | Byers et al. |
| 3,945,753 A | * | 3/1976 | Byers et al. |
| 4,134,706 A | * | 1/1979 | Stewart |
| 4,244,667 A | | 1/1981 | Timmons |
| 4,536,107 A | | 8/1985 | Sandy et al. |
| 4,620,822 A | * | 11/1986 | Haque et al. |
| 4,625,593 A | | 12/1986 | Schmotzer |
| 5,029,392 A | | 7/1991 | Bingham et al. |
| 5,193,951 A | | 3/1993 | Schimke |
| 5,700,113 A | | 12/1997 | Stone et al. |
| 5,727,436 A | | 3/1998 | Swedberg et al. |
| 5,820,319 A | | 10/1998 | Hull et al. |
| 6,071,046 A | * | 6/2000 | Hecht et al. |
| 6,354,773 B1 | * | 3/2002 | Konen |

* cited by examiner

*Primary Examiner*—William M. Pierce
(74) *Attorney, Agent, or Firm*—Patzik, Frank & Samotny Ltd.

(57) ABSTRACT

A drill bit for use in association with a power or hand drill comprising a drill bit head and shaft. The drill bit head includes a drill bit cutting head and a guide point. The drill bit cutting head includes a first and a second cutting vane. Each cutting vane includes a first cutting edge which extends perpendicular to the axis of rotation and is provided for removing workpiece material, a second cutting edge which extends parallel to the axis of rotation and is provided for forming a substantially smooth workpiece bore, and a channel for facilitating the expulsion of removed workpiece material away from the first cutting surface as the drill bit passes through the workpiece.

31 Claims, 8 Drawing Sheets

DRILL BIT APPARATUS AND METHOD OF MANUFACTURE OF SAME

This application claims the benefit of U.S. Provisional Application No. 60/174,209, filed Jan. 3, 2000.

BACKGROUND OF THE INVENTION

1. Field of the Invention

The present invention is directed in general to drill bits and boring equipment, and more particularly to a drill bit apparatus and corresponding method of manufacturing the same.

2. Background Art

Drill bits have long been used in the machining and building arts. Generally, drill bits have surfaces which engage and remove material from a workpiece, thereby creating a workpiece bore. Self-feeding drill bits, as opposed to most spade bits or auger bits, are generally preferred because they cut workpiece bores faster, require less axial force to operate, and can produce workpiece bores which have larger diameters. However, conventional self-feeding drill bits fail to produce smooth workpiece bores. Further, many conventional self-feeding drill bits chip the surface of the workpiece which remains. In other words, most conventional self-feeding drill bits cause chipping of the workpiece surface outside the circumference of the workpiece bore as the drill bit enters the workpiece.

While most drill bits are used to bore a workpiece bore which extends through the surface of the workpiece, drill bits can also be used to bore a cavity into a workpiece. In such a case, most conventional self-feeding drill bits are inadequate because after the drill bit is withdrawn, uncut material remains at the bottom of the cavity. In particular, as most self-feeding drill bits include self-feeding subassemblies for drawing the drill bit into the workpiece. Such subassemblies typically comprise a screw which protrudes from the top-center portion of the drill bit. However, most conventional self-feeding drill bits are inadequate for producing cavities, because when the drill bit is withdrawn from the cavity, uncut material typically remains around the hole created by the screw. Therefore, such conventional drill bits produce cavities having an unsuitable finish.

Therefore, it is a first object of the present invention to provide a substantially self-feeding cutting apparatus adapted to produce a bore and/or a cavity in a workpiece.

It is a second object of the present invention to provide a cutting apparatus having a low manufacturing cost and low production cost.

It is a further object of the present invention to provide a cutting apparatus which exhibits extended durability, thereby minimizing tooling downtime.

Yet another object of the present invention is to provide a cutting apparatus having a drill bit head removably secured to a shaft.

Another object of the present invention is to provide a cutting head that can maintain the sharpness of the cutting edges, so that chip formation can be properly controlled, and so that the bore surfaces can be of suitable surface finish.

A further object of the present invention is to provide a cutting head having two cutting vanes, each vane having two cutting edges which are substantially perpendicular to each other.

A further object of the present invention is to provide a channel for efficiently expelling chips formed during the drilling operation.

Yet another object of the present invention is to provide a grasping assembly having substantially flat faces to be used when securing the drill bit head to the shaft.

Another object of the present invention is to provide cutting edges which are adapted to produce a cavity wherein all of the surfaces are of a suitable surface finish.

SUMMARY OF THE INVENTION

The above-listed objects are met or exceeded by the present drill bit for producing workpiece bores. The drill bit is composed of a drill bit head and shaft. The drill bit head includes a drill bit cutting head and a guide point. The drill bit cutting head includes a first and a second cutting vane, and opposing surfaces for grasping and rotating the drill bit cutting head about the axis of rotation of the drill bit, thereby securing the drill bit head to the shaft.

Each cutting vane includes a first cutting edge which extends perpendicular to the axis of rotation and is provided for removing workpiece material, a second cutting edge which extends parallel to the axis of rotation and is provided for forming a substantially smooth workpiece bore, and a channel for facilitating the expulsion of removed workpiece material away from the first cutting surface as the drill bit passes through the workpiece.

BRIEF DESCRIPTION OF THE DRAWINGS

Other objects and advantages of the invention will become apparent upon reading the following detailed description and upon reference to the drawings in which.

WRITTEN DESCRIPTION OF THE INVENTION

Figure 1:
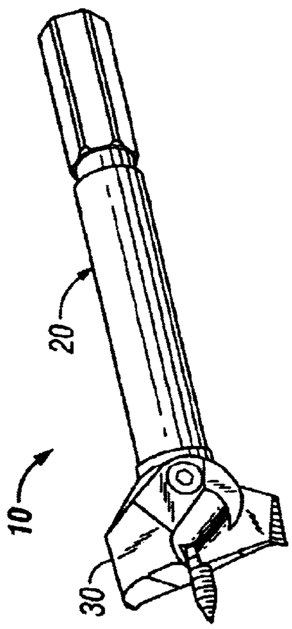
FIG. 1 is a perspective view of the drill bit head and shaft.

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

Turning now to the drawings, and more particularly to FIG. 1, a drill bit 10 having a shaft 20 removably secured to a drill bit head 30 is shown. In general, the drill bit 10 is used for drilling through wood, such as wood studs used in home construction. For example, such drill bits are useful for the drilling of holes in building materials for passage of electrical conduit and piping. Of course, the drill bits may be used for other applications and, in turn, may be of varying sizes. Additionally, drill bits may be utilized for drilling through other materials, such as plastics, composites, metals and the like.

Figure 2:
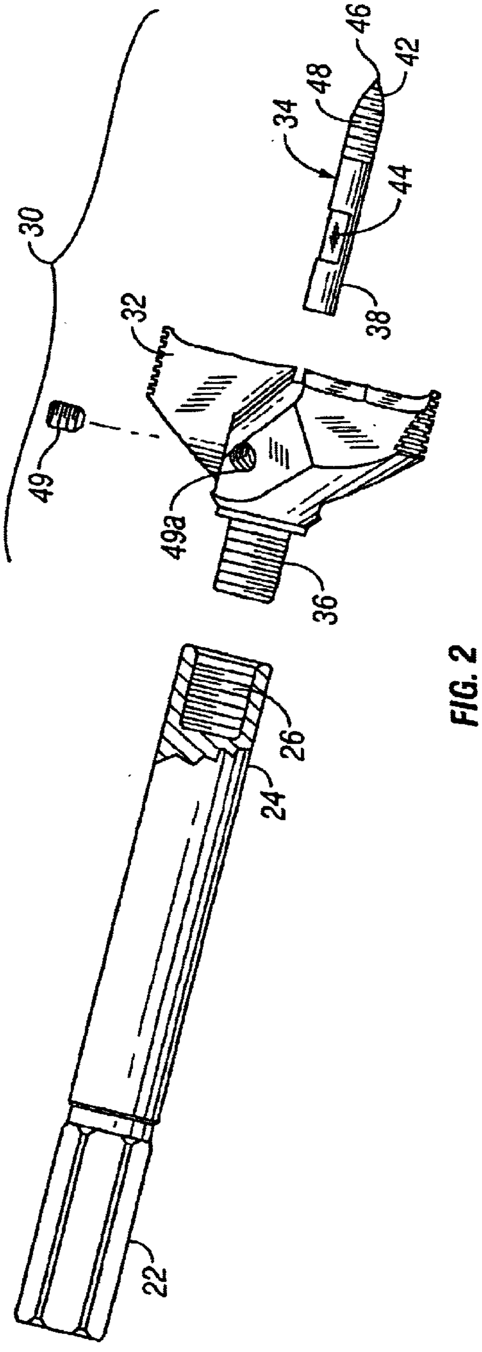
FIG. 2 is an exploded view of the drill bit head and shaft.

As shown in FIG. 2, the shaft 20 includes a proximal end portion 22 and a distal end portion 24. The proximal end portion 22 of the shaft 20 has a hexagonal cross-section for engagement by a conventional wrench or drill. A threaded bore 26 located in the distal end portion 24 of the shaft 20 is provided for removably securing the head 30 to the shaft 20. Alternate embodiments may be constructed wherein the shaft 20 is secured to the drill bit head 30 using a keyed press fit, welding or the like. In the alternative, the drill bit head 30 and the shaft 20 may comprise a single integrated member.

In a preferred embodiment, the shaft 20 is manufactured from a rigid material capable of withstanding the mechanical and thermal stresses exerted on the drill bit 10 during the drilling operation. For example, the shaft 20 should be capable of withstanding the torque exerted by the wrench, drill or other tool with which the drill bit 10 is used. Materials having such physical characteristics include, but are not limited to: titanium, aluminum, iron, or other metal, or alloys thereof; and high-impact composite plastics. The material employed in the construction of the shaft 20 will often depend upon the particular application for which the drill bit 10 is used, and would be readily determinable by one with ordinary skill in the art.

Referring again to FIG. 2, the drill bit head 30 includes a cutting head 32 and a guide point 34. A threaded neck 36 extends from the bottom portion of the cutting head 32 and is configured so as to matingly engage the corresponding threaded bore 26 of the shaft 20. In a preferred embodiment, and with the understanding that the invention is not limited thereto, the threaded neck 26 has a 0.156 inch bore or through-hole, an outside diameter of approximately 0.375 inches, and twenty-four threads per inch.

The guide point 34 has a proximal end portion 38 and a distal end portion 42. The proximal end portion 38 has a smooth cylindrical surface and has a seat 44. The distal end portion 42 has a threaded surface terminating in a point 46. In the preferred embodiment, the distal end portion 42 has twenty-four threads per inch and a diameter of approximately 0.070 inches at point 46, a diameter of approximately 0.180 inches at threaded midpoint 48, and a diameter of approximately 0.160 inches at the location where the guide point 34 enters the cutting head 32.

Similar to the shaft 20, it is preferred that the cutting head 32 and guide point 34 be constructed from a rigid material capable of withstanding the thermal and mechanical stresses to which the drill bit 10 will be exposed, and without substantial deformation. It is advantageous to utilize a material which can retain the sharpness of the cutting edges, to limit the need to re-sharpen these edges, and to generally increase the lifetime of the cutting head 32 and guide point 34. The material to be employed in the construction of the cutting head 32 and guide point 34 will often depend upon the particular application for which the drill bit 10 is used, and would be readily determinable by one with ordinary skill in the art.

A flush fit screw 49 extends through a threaded bore aperture defined by edge 49*a* to contact the guide point seat 44, and retains the guide point 34 in the drilling head 22. Further, the seat 44 prevents the guide point 34 from rotating independently from the drilling head 22 during the drilling operation.

Figure 3:
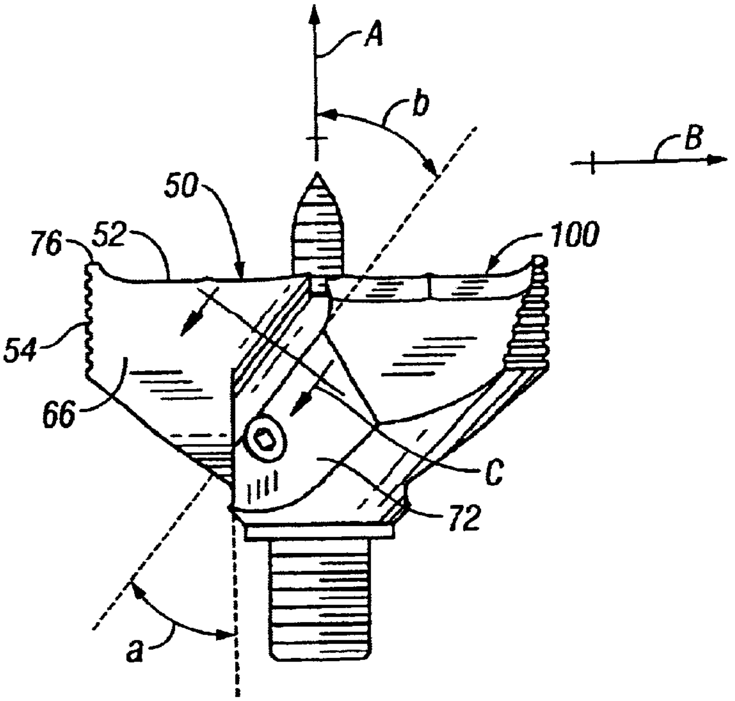
FIG. 3 is a front side view of the drill bit head of the first embodiment.

A first embodiment of the cutting head 32 is shown and described in FIGS. 3 through 9. This embodiment is adapted to produce a workpiece bore which has a diameter of approximately 1.75 inches. As shown in FIG. 3, the cutting head 32 of the first embodiment includes a first cutting vane 50 and a second cutting vane 100. The first cutting vane 50 and second cutting vane 100 are substantially identical. Further, the cutting vanes 50,100 are oriented about an axis of rotation, defined by line A, so as to be radially positioned 180 degrees apart.

Figure 4:
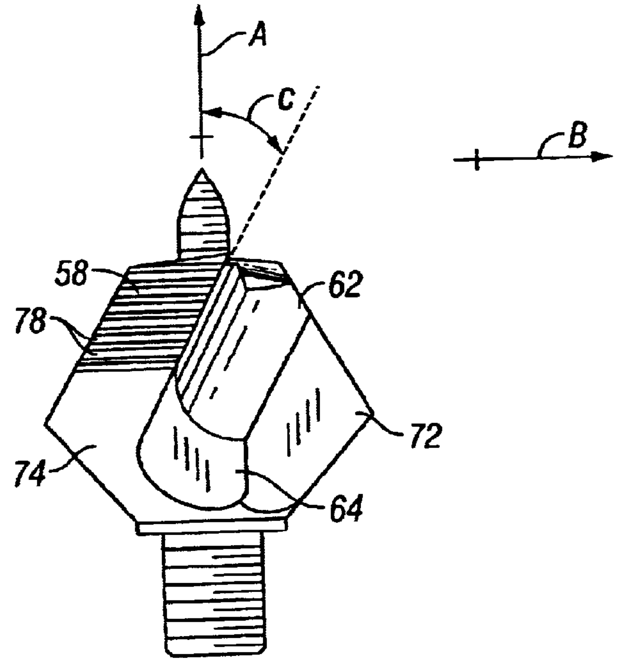
FIG. 4 is a side view of the first cutting vane of the drill bit head of the first embodiment.

The first cutting vane 50, as shown in FIGS. 3, 4, 5, 6 and 7, includes a first cutting edge 52, a second cutting edge 54, an upper surface 56, an outside surface 58, a first inside surface 62, a second inside surface 64, a front surface 66 which extends substantially parallel to a trailing surface 68, and a grasping surface 72. The first cutting edge 52 is formed by the intersection of the upper surface 56 and front surface 66. The second cutting edge 54 is formed by the intersection of front surface 66 and outside surface 58, and extends from the upper surface 56 to the lower surface 74. It is preferred that the lower surface 74, as best shown in FIGS. 3 and 4, extend approximately 45 degrees relative to the axis of rotation of the drill bit 10, as defined by line A, so as to form a relief angle.

The upper surface 56 is generally planar and extends substantially perpendicular to the axis of rotation of the drill bit 10, as defined by line A. Upper surface 56 includes a raised edge 76 located proximal to the outside surface 58, a curved edge 77*a* and a raised inside cutting edge 77*b* for removing workpiece material proximal to the guide point 34. In the preferred embodiment, the raised inside cutting edge 77*b* extends substantially perpendicular to the direction of rotation of the drill bit 10, as defined by line B.

The raised edge 76 extends from the front surface 66 to the trailing surface 68. During the operation, as the drill bit head 30 approaches the workpiece surface, the raised edge 76 contacts the work piece to define the circumference of the workpiece bore. The raised edge 76 facilitates the passage of the drill bit 10 through the work material, as well as the formation of chips during the drilling operation. Further, the raised edge 76 prevents undesired chipping of the work surface outside the circumference of the workpiece bore as the cutting head 32 contacts the workpiece.

A plurality of threadlike ridges 78 protrude from the outside surface 58. In addition, the ridges 78 extend substantially parallel to the direction of rotation of the drill bit 10, as defined by line B. These ridges 78 minimize the surface area of the outside surface 58 contacting the bore surface of the workpiece, therefore minimizing the friction and heat generated during drilling. Further, the ridges 78 cooperate with the guide point 34 to advance the drill bit 10 during the drilling operation.

In the preferred embodiment, the first cutting vane 50 includes a channel for efficiently expelling chips formed during the drilling operation. In one preferred embodiment, the first inside surface 62 defines a first region and the second inside surface 64 defines a second region, the first and second regions defining the channel.

Figure 5:
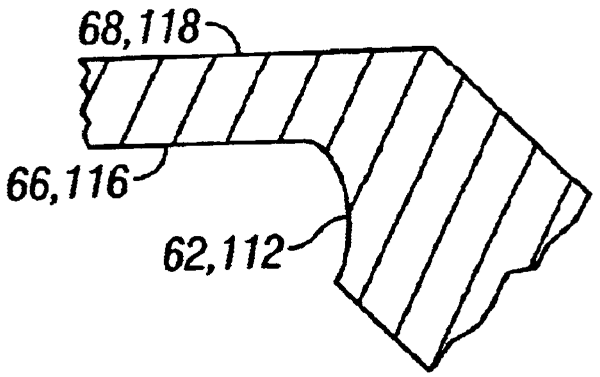
FIG. 5 is a cross sectional view of the first cutting vane and the second cutting vane of the drill bit head of the first embodiment taken alone lines C and D.
Figure 6:
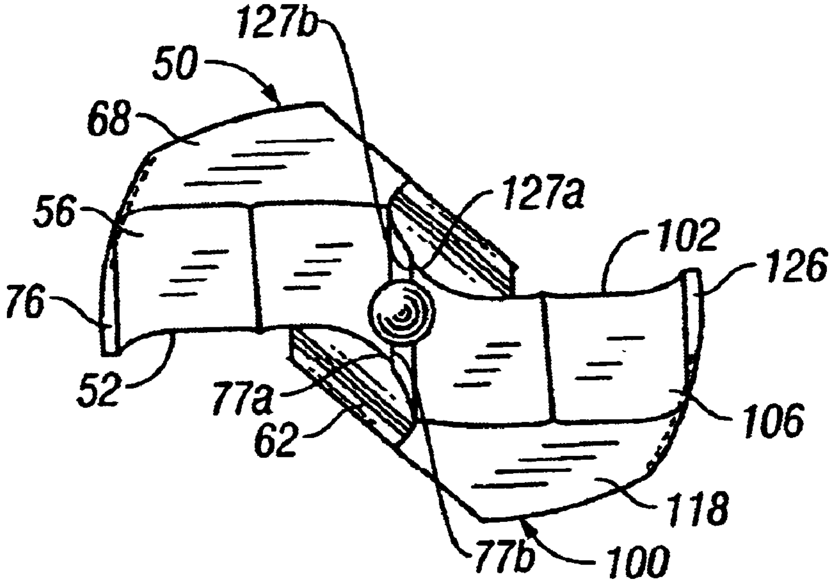
FIG. 6 is top view of the drill bit head of the first embodiment.
Figure 7:
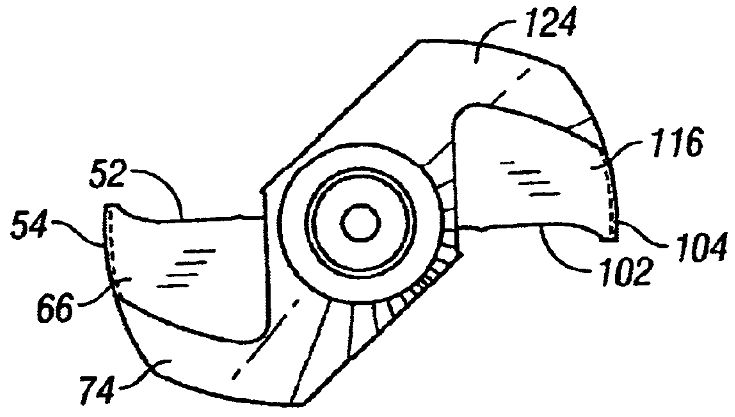
FIG. 7 is a bottom view of the drill bit head of the first embodiment.

As shown in FIGS. 3 through 6, the first inside surface 62 is substantially fluted in shape, and the second inside surface 64 is substantially flat. FIG. 5 is a view along line C and illustrates the unique shape of the first inside surface 62. The first inside surface 62 extends at a first angle a relative to the second inside surface 64. It is preferred that the first angle a be an acute angle between 0 degrees and 90 degrees, most preferably approximately 45 degrees. Further, the first inside surface 62 extends at a second angle b relative to the axis of rotation A. It is preferred that the second angle b be an acute angle between 0 and 90 degrees, most preferably approximately 45 degrees. The second inside surface 64 is orientated so as to be substantially parallel to the axis of rotation A. As shown in FIG. 4, the front surface 66 extends at a third angle c relative to the axis of rotation A. In is preferred that the third angle c be an acute angle between 0 and 90 degrees, most preferably approximately 55 degrees.

The first, second and third angles a,b,c employed with each of the first and second inside surfaces 62,64 and the front surface 66 may depend upon the nature of the material from which the workpiece is constructed, and are readily determinable by one with ordinary skill in the art. Additionally, it is likewise contemplated that an alternate embodiment could be constructed having a channel composed of more than two regions, such as three or four regions, in which case each such region will be positioned at an angle (such as angle α) relative to each other so as to facilitate the most efficient expulsion of chips formed during the drilling operation. During the drilling operation, chips form at the first cutting edge 52 and second cutting edge 54. The chips travel along the front surface 66, first inside surface 62 and second inside surface 64. The shapes of the inside surfaces 62,64, in combination with the angle of the front surface 66 relative to the axis of rotation A, namely angle c, promote the expulsion of chips during the drilling operation.

Figure 8:
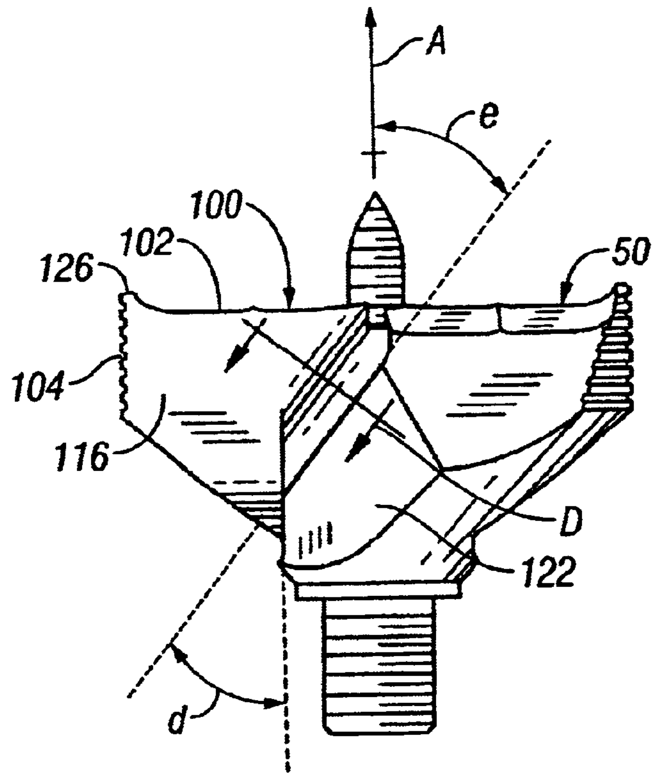
FIG. 8 is rear view of the drill bit head of the first embodiment.
Figure 9:
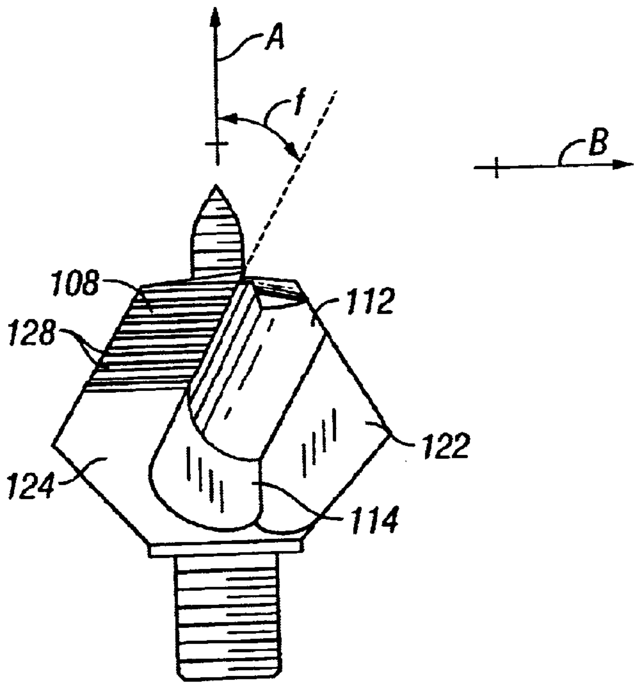
FIG. 9 is a side view of the second cutting vane of the drill bit head of the first embodiment.

Referring to FIGS. 6 through 9, the second cutting vane 100 will now be discussed. As shown in FIGS. 6 through 9, the second cutting vane 100 includes a first cutting edge 102, a second cutting edge 104, an upper surface 106, an outside surface 108, a first inside surface 112, a second inside surface 114, a front surface 116 which extends substantially parallel to a trailing surface 118, and a grasping surface 122. The first cutting edge 102 is formed by the intersection of the upper surface 106 and front surface 116. The second cutting edge 104 is formed by the intersection of front surface 116 and outside surface 108, and extends from the upper surface 106 to the lower surface 124. It is preferred that the lower surface 124, as best shown in FIGS. 8 and 9, extend approximately 45 degrees relative to the axis of rotation of the drill bit 10, as defined by line A, so as to form a relief angle.

The upper surface 106 is generally planar and extends substantially perpendicular to the axis of rotation of the drill bit 10, as defined by line A. Upper surface 106 includes a raised edge 126 located proximal to the outside surface 108, a curved edge 127*a* and a raised inside cutting edge 127*b* for removing workpiece material proximal to the guide point 34. In the preferred embodiment, the raised inside cutting edge 127*b* extends substantially perpendicular to the direction of rotation of the drill bit 10, as defined by line B.

The raised edge 126 extends from the front surface 116 to the trailing surface 118. During the operation, as the drill bit head 30 approaches the workpiece surface, the raised edge 126 contacts the work piece to define the circumference of the workpiece bore. The raised edge 126 facilitates the passage of the drill bit 10 through the work material, as well as the formation of chips during the drilling operation. Further, the raised edge 126 prevents undesired chipping of the work surface outside the circumference of the workpiece bore as the cutting head 32 contacts the workpiece.

A plurality of threadlike ridges 128 protrude from the outside surface 108. In addition, the ridges 128 extend substantially parallel to the direction of rotation of the drill bit 10, as defined by line B. These ridges 128 minimize the surface area of the outside surface 108 contacting the bore surface of the workpiece, therefore minimizing the friction and heat generated during drilling. Further, the ridges 128 cooperate with the guide point 34 to advance the drill bit 10 during the drilling operation.

In the preferred embodiment, the second cutting vane 100 includes a channel for efficiently expelling chips formed during the drilling operation. In one preferred embodiment, the first inside surface 112 defines a first region and the second inside surface 114 defines a second region, the first and second regions defining the channel.

As shown in FIGS. 5 through 9, the first inside surface 112 is substantially fluted in shape, and the second inside surface 114 is substantially flat. FIG. 5 is a view along line D and illustrates the unique shape of the first inside surface 112. The first inside surface 112 extends at a first angle d relative to the second inside surface 114. It is preferred that the first angle d be an acute angle between 0 degrees and 90 degrees, most preferably approximately 45 degrees. Further, the first inside surface 112 extends at a second angle e relative to the axis of rotation A. It is preferred that the second angle e be an acute angle between 0 and 90 degrees, most preferably approximately 45 degrees. The second inside surface 114 is orientated so as to be substantially parallel to the axis of rotation A. As shown in FIG. 9, the front surface 116 extends at a third angle f relative to the axis of rotation A. In is preferred that the third angle f be an acute angle between 0 and 90 degrees, most preferably approximately 55 degrees.

The first, second and third angles d,e,f employed with each of the first and second inside surfaces 112,114 and the front surface 116 may depend upon the nature of the material from which the workpiece is constructed, and are readily determinable by one with ordinary skill in the art. Additionally, it is likewise contemplated that an alternate embodiment could be constructed having a channel composed of more than two regions, such as three or four regions, in which case each such region will be positioned at an angle (such as angle d) relative to each other so as to facilitate the most efficient expulsion of chips formed during the drilling operation. During the drilling operation, chips form at the first cutting edge 102 and second cutting edge 104. The chips travel along the front surface 116, first inside surface 112 and second inside surface 114. The shapes of the inside surfaces 112,114, in combination with the angle of the front surface 116 relative to the axis of rotation A, namely angle d, promote the expulsion of chips during the drilling operation.

The first cutting vane grasping surface 72 (FIG. 3) corresponds and cooperates with the second cutting vane grasping surface 122 (see FIG. 8) so as to form two opposing parallel surfaces which, in combination, provide a grasping assembly for tightening or securing the drill bit head 30 to the shaft 20. To secure the drill bit head 30 to the shaft 20, a wrench, pliers or other grasping tool can be used to grip the grasping surfaces 72,122, and rotate the drill bit head 30 relative to the shaft 20.

To manufacture the drill bit 10, a material stock suitable for shaft 20 is first obtained. Such a material, as explained above, includes desired dimensional and physical characteristics. Once obtained, proximal end portion 32 is machined to render a hexagonal cross-section or other suitable configuration, thereby making the drill bit 10 attachable to a wrench or drill. Similarly, threaded bore 36 is machined into distal end portion 34 and adapted matingly engage the threaded neck 36 of the drill bit head 30. To increase rigidity, the shaft 20 (as well as the guide point 34) may be heat treated to the desired hardness of each. Preferably, each is heat treated to a hardness of approximately 40 to 43 Rockwell. However, one with ordinary skill in the art could readily determine the requisite hardness in view of the intended application of the drill bit 10.

To construct the drill bit head 30, a suitable billet of material is obtained. Again, the material selected will depend upon the loads, stresses, temperatures and other conditions to which the drill bit head 30 will be exposed. Once the material is selected, the material is machined as necessary to render the above-described surfaces and edges of each of first cutting vane 50 and second cutting vane 100. A bore (not shown) is drilled into the body of the drill bit head 30, distal from the threaded neck 36, and along the axis of rotation A. The bore acts as a seat for receipt of the guide point 34.

Additionally, a suitable threadform is machined into neck 36 and is adapted to matingly engage the bore 26 of the shaft 20. Lastly, a threaded bore 49*a* is drilled through the first cutting vane grasping surface 72 for receipt of the flush fit screw 49. Once the drill bit head 30 is formed, it may be heat treated to the desired hardness. Preferably, the drill bit head 30 is heat treated to a hardness of approximately 48 to 50 Rockwell. However, one with ordinary skill in the art could readily determine the requisite hardness in view of the intended application of the drill bit 10.

Once fully machined and, where necessary or desired, heat treated, the drill bit head 30, the shaft 20 and the guide point 34 are assembled. First, the guide point 34 is inserted into the bore 24*a*. Once inserted, the flush fit screw 49 is inserted into the threaded bore 49*a* to secure the guide point 34 in position, and to preclude inadvertent undesired rotation thereof relative to the cutting head 32.

Next, neck 36 is inserted into bore 26 of shaft 20. By gripping the substantially flat grasping surfaces 72,122 of the drill bit head 30 with a wrench or other grasping tool, while precluding rotation of the shaft 20, a sizable torque can be applied to the head 30 to fully seat the drill bit head 30 onto the shaft 20. Once assembled, the drill bit 10 is ready for use. Grabbing the grasping surfaces 72,122 of the drill bit head 30 with a wrench or other tool and rotating the head 30 in the opposite direction can result in removal of the head 30 from the shaft 20.

In operation, as the guide point 34 contacts the work surface, the threadform thereon pulls the drill bit head 30 into the workpiece. As the drill bit head 30 approaches, raised edges 76,126 contact the work piece to define the circumference of the workpiece bore. Next, the first and second cutting vane first cutting edges 52,102 engage and cut the work piece. As the drill bit head 30 advances into the workpiece, the first and second cutting vane second cutting edges 54,104 further promote the formation of chips and a substantially smooth workpiece bore. The chips generated by the cutting action of the first cutting vane 50 are expelled away from the bore through the channel formed by the first region and the second region as defined by the first and second inside surfaces 62,64, respectively. The chips generated by the cutting action of the second cutting vane 100 are expelled away from the bore through the channel formed by the first region and the second region as defined by the first and second inside surfaces 122,124, respectively. The drilling operation continues until a workpiece cavity of suitable depth is formed, or until the workpiece bore extends through the workpiece itself. Where only a workpiece cavity is produced, the curved edges 77*a*,127*a* and raised inside cutting edges 77*b*,127*b* of the first and second cutting vane 20,100 remove workpiece material proximal to the guide point 34 point of entry.

Figure 10:
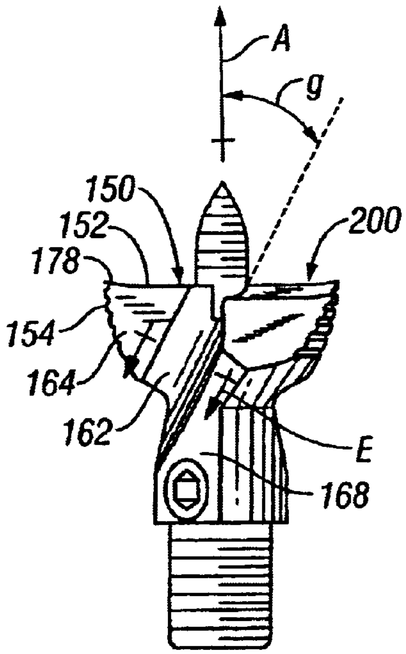
FIG. 10 is a front side view of the drill bit head of the second embodiment.

A second embodiment of the drill bit head 30 is shown and described in FIGS. 10 through 16. This embodiment is adapted to produce a workpiece bore which has a diameter of approximately 0.875 inches. As shown in FIG. 10, the cutting head 32 of the second embodiment includes a first cutting vane 150 and a second cutting vane 200. The first cutting vane 150 and second cutting vane 200 are substantially identical. Further, the cutting vanes 150,200 are oriented about an axis of rotation, defined by line A, so as to be radially positioned 180 degrees apart.

The first cutting vane 150, as shown in FIGS. 10 through 14, includes a first cutting edge 152, a second cutting edge 154, an upper surface 156, an outside surface 158, an inside surface 162, a front surface 164 which extends substantially parallel to a trailing surface 166, a grasping surface 168, a substantially flat first side surface 172 and a rounded second side surface 174. The first cutting edge 152 is formed by the intersection of the upper surface 156 and front surface 164. The second cutting edge 154 is formed by the intersection of front surface 164 and outside surface 158. Also, the second cutting edge 154 extends from the upper surface 156 to the lower surface 176.

The upper surface 156 is generally planar and extends substantially perpendicular to the axis of rotation of the drill bit 10, as defined by line A. As shown in FIG. 10, the upper surface 156 includes a raised edge 178 located proximal to the outside surface 158, which extends from the front surface 164 to the trailing surface 166, a curved edge 167*a* and a raised inside cutting edge 167*b* for removing workpiece material proximal to the guide point 34. In the preferred embodiment, the raised inside cutting edge 167*b* extends substantially perpendicular to the direction of rotation of the drill bit 10, as defined by line B.

The raised edge 178 facilitates the passage of the drill bit 10 through the work material, as well as the formation of chips during the drilling operation. Further, the raised edge 178 prevents undesired chipping of the work surface outside the circumference of the workpiece bore as the cutting head 32 contacts the workpiece.

A plurality of threadlike ridges 182 protrude or extend from the outside surface 58. In addition, the ridges 182 extend substantially parallel to the direction of rotation of the drill bit 10, as defined by line B. These ridges 182 minimize the surface area of the outside surface 158 contacting the bore surface of the workpiece, therefore minimizing the friction and heat generated during drilling. Further, the ridges 182 cooperate with the guide point 34 to advance the drill bit 10 during the drilling operation.

In the preferred embodiment, the first cutting vane 150 includes a channel for efficiently expelling chips formed during the drilling operation. In one preferred embodiment, the inside surface 162 defines a first region, the first region defining the channel.

Figure 11:
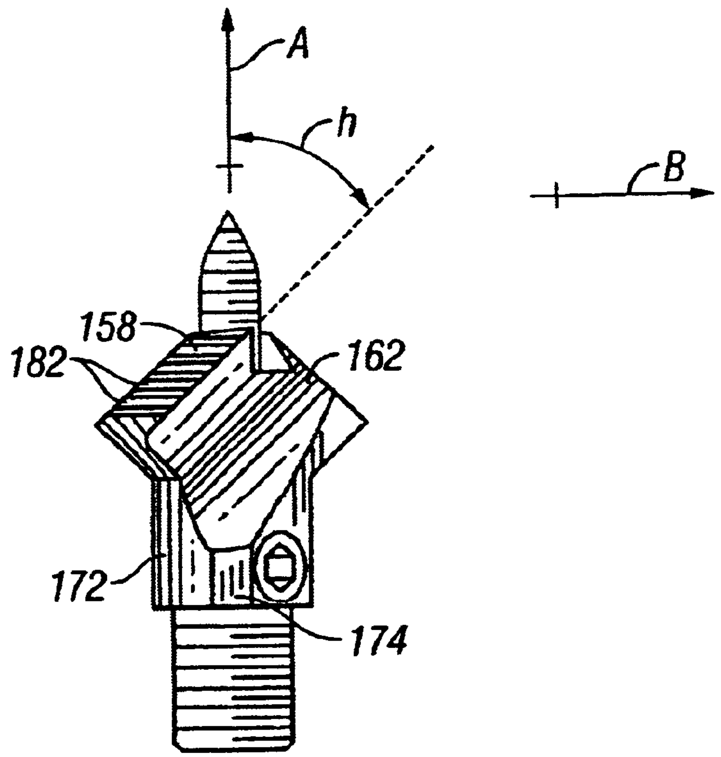
FIG. 11 is a side view of the first cutting vane of the drill bit head of the second embodiment.
Figure 12:
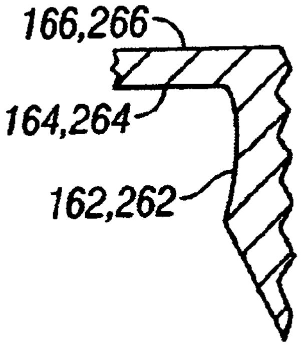
FIG. 12 is a cross sectional view of the first cutting vane and the second cutting vane of the drill bit head of the first embodiment.
Figure 13:
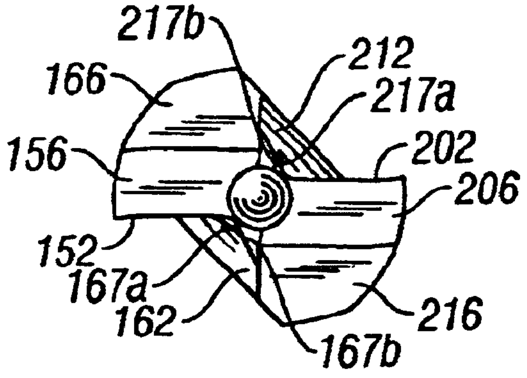
FIG. 13 is top view of the drill bit head of the second embodiment.
Figure 14:
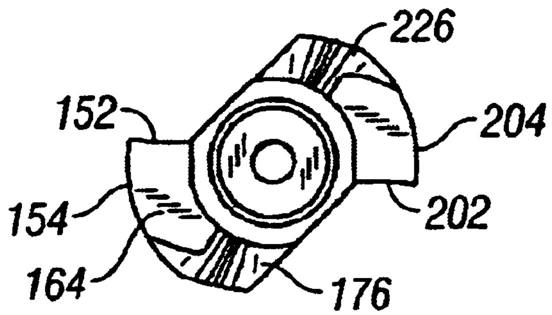
FIG. 14 is a bottom view of the drill bit head of the second embodiment.

As shown in FIGS. 11 through 13, the inside surface 162 is substantially fluted in shape and increases in width (the distance from the front surface 164 to the grasping surface 168) as the inside surface 162 progresses from the guide point 34 toward the lower surface 176. FIG. 12 is a view along line E and illustrates the unique shape of the inside surface 162. The inside surface 162 extends at a first angle g relative to the axis of rotation A. It is preferred that the first angle g be an acute angle between 0 and 90 degrees, most preferably approximately 45 degrees. As shown in FIG. 4, the front surface 164 extends at a second angle h relative to the axis of rotation A. In is preferred that the second angle h be an acute angle between 0 and 90 degrees, most preferably approximately 55 degrees.

The first and second angles g,h employed with the inside surface 162 and the front surface 164 may depend upon the nature of the material from which the workpiece is constructed, and are readily determinable by one with ordinary skill in the art. Additionally, it is likewise contemplated that an alternate embodiment could be constructed having a channel composed of more than one region, such as two or three regions, in which case each such region will be positioned at an angle (such as angle g) relative to each other so as to facilitate the most efficient expulsion of chips formed during the drilling operation. During the drilling operation, chips form at the first cutting edge 152 and second cutting edge 154. The chips travel along the front surface 164 and the inside surface 162. The shape of the inside surface 162, in combination with the angle of the front surface 164 relative to the axis of rotation A, namely angle h, promote the expulsion of chips during the drilling operation.

Referring to FIGS. 12 through 16, the second cutting vane 200 will now be discussed. As shown in FIGS. 13 through 16, the second cutting vane 200 includes a first cutting edge 202, a second cutting edge 204, an upper surface 206, an outside surface 208, an inside surface 212, a front surface 214 which extends substantially parallel to a trailing surface 216, a grasping surface 218, a substantially flat first side surface 222 and a rounded second side surface 224. The first cutting edge 202 is formed by the intersection of the upper surface 206 and front surface 214. The second cutting edge 204 is formed by the intersection of front surface 214 and outside surface 208. Also, the second cutting edge 204 extends from the upper surface 206 to the lower surface 226.

Figure 15:
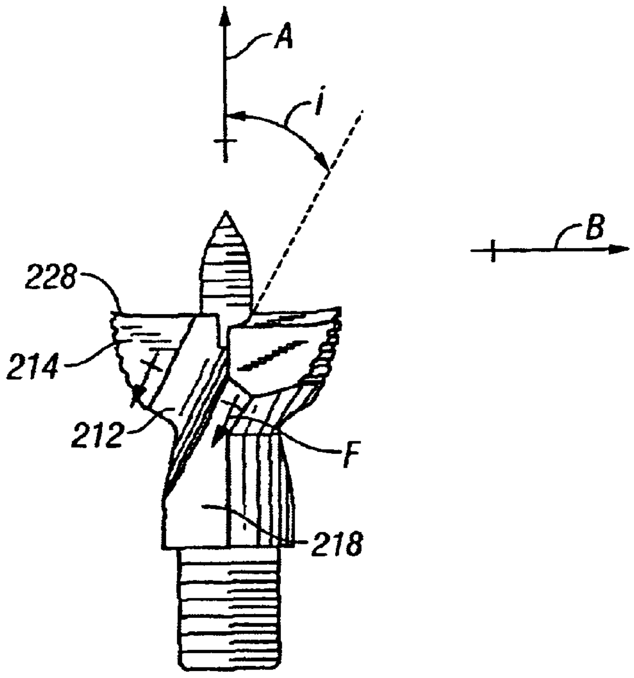
FIG. 15 is rear view of the drill bit head of the second embodiment.
Figure 16:
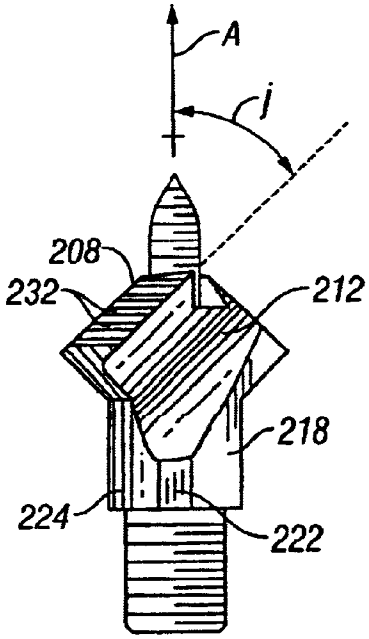
FIG. 16 is a side view of the second cutting vane of the drill bit head of the second embodiment.

The upper surface 206 is generally planar and extends substantially perpendicular to the axis of rotation of the drill bit 10, as defined by line A. As shown in FIG. 15, the upper surface 206 includes a raised edge 228 located proximal to the outside surface 208, which extends from the front surface 214 to the trailing surface 216, a curved edge 217*a* and a raised inside cutting edge 217*b* for removing workpiece material proximal to the guide point 34. In the preferred embodiment, the raised inside cutting edge 217*b* extends substantially perpendicular to the direction of rotation of the drill bit 10, as defined by line B.

The raised edge 228 facilitates the passage of the drill bit 10 through the work material, as well as the formation of chips during the drilling operation. Further, the raised edge 228 prevents undesired chipping of the work surface outside the circumference of the workpiece bore as the cutting head 32 contacts the workpiece.

A plurality of threadlike ridges 232 protrude or extend from the outside surface 58. In addition, the ridges 182 extend substantially parallel to the direction of rotation of the drill bit 10, as defined by line B. These ridges 232 minimize the surface area of the outside surface 208 contacting the bore surface of the workpiece, therefore minimizing the friction and heat generated during drilling. Further, the ridges 232 cooperate with the guide point 34 to advance the drill bit 10 during the drilling operation.

In the preferred embodiment, the second cutting vane 200 includes a channel for efficiently expelling chips formed during the drilling operation. In one preferred embodiment, the inside surface 212 defines a first region, the first region defining the channel.

As shown in FIGS. 12 through 16, the inside surface 212 is substantially fluted in shape and increases in width (the distance from the front surface 214 to the grasping surface 218) as the inside surface 212 progresses from the guide point 34 toward the lower surface 226. FIG. 12 is a view along line F and illustrates the unique shape of the inside surface 212. The inside surface 212 extends at a first angle i relative to the axis of rotation A. It is preferred that the first angle i be an acute angle between 0 and 90 degrees, most preferably approximately 45 degrees. As shown in FIG. 4, the front surface 214 extends at a second angle j relative to the axis of rotation A. In is preferred that the second angle j be an acute angle between 0 and 90 degrees, most preferably approximately 55 degrees.

The first and second angles i,j employed with the inside surface 212 and the front surface 214 may depend upon the nature of the material from which the workpiece is constructed, and are readily determinable by one with ordinary skill in the art. Additionally, it is likewise contemplated that an alternate embodiment could be constructed having a channel composed of more than one region, such as two or three regions, in which case each such region will be positioned at an angle (such as angle i) relative to each other so as to facilitate the most efficient expulsion of chips formed during the drilling operation. During the drilling operation, chips form at the first cutting edge 202 and second cutting edge 204. The chips travel along the front surface 214 and the inside surface 212. The shape of the inside surface 212, in combination with the angle of the front surface 214 relative to the axis of rotation A, namely angle j, promote the expulsion of chips during the drilling operation.

The first cutting vane grasping surface 158 (FIG. 10) corresponds and cooperates with the second cutting vane grasping surface 218 (see FIG. 15) so as to form two opposing parallel surfaces which, in combination, provide a grasping assembly for tightening or securing the drill bit head 30 to the shaft 20. To secure the drill bit head 30 to the shaft 20, a wrench, pliers or other grasping tool can be used to grip the grasping surfaces 158,218, and rotate the drill bit head 30 relative to the shaft 20.

The manufacture and assembly of the cutting head 32 of the second embodiment is substantially identical to that of the cutting head 32 of the first embodiment. Therefore, its discussion will be omitted. However, operation of the cutting head 32 of the second embodiment will now be described. In operation, as the guide point 34 contacts the work surface, the threadform thereon pulls the drill bit head 30 into the workpiece. As the drill bit head 30 approaches, raised edges 178,228 contact the work piece to define the circumference of the workpiece bore. Next, the first and second cutting vane first cutting edges 152,202 engage and cut the work piece. As the drill bit head 30 advances into the workpiece, the first and second cutting vane second cutting edges 154,204 further promote the formation of chips and a substantially smooth workpiece bore. The chips generated by the cutting action of the first cutting vane 150 are expelled away from the bore through the channel formed by the first region as defined by the inside surface 162. The chips generated by the cutting action of the second cutting vane 200 are expelled away from the bore through the channel formed by the first region as defined by the inside surface 212. The drilling operation continues until a workpiece bore of suitable depth is formed, or until the workpiece bore extends through the workpiece itself.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A drill bit assembly for cutting a bore into a workpiece, comprising:

a shaft; and a drill bit head connected to one end of the shaft, the drill bit head and the shaft defining an axis of rotation, and the drill bit head comprising a first cutting vane and a second cutting vane, wherein the first and second cutting vanes are spaced substantially equidistant about the axis of rotation, the first cutting vane comprising:

an upper surface that extends substantially perpendicular to the axis of rotation;

a lower surface extending outwardly in a direction relative to the axis of rotation;

a front surface extending between the lower surface and the upper surface at a third angle relative to the axis of rotation, the upper surface and the front surface defining a first cutting edge that is substantially perpendicular to the axis of rotation;

a trailing surface extending between the upper surface and the lower surface and being opposed to the front surface;

an outside surface extending between the lower surface and the upper surface, wherein the outside surface extends substantially parallel to the axis of rotation, and wherein the front surface and the outside surface define a second cutting edge that is substantially parallel to the axis of rotation; and an inside surface defining a channel and being located adjacent the front surface and the axis of rotation;

the second cutting vane comprising:

an upper surface that extends substantially perpendicular to the axis of rotation;

a lower surface extending outwardly in a direction relative to the axis of rotation;

a front surface extending between the lower surface and the upper surface at a third angle relative to the axis of rotation, the upper surface and the front surface defining a first cutting edge that is substantially perpendicular to the axis of rotation;

a trailing surface extending between the upper surface and the lower surface and being opposed to the front surface;

an outside surface extending between the lower surface and the upper surface, wherein the outside surface extends substantially parallel to the axis of rotation, and wherein the front surface and the outside surface define a second cutting edge that is substantially parallel to the central longitudinal axis; and an inside surface defining a channel and being located adjacent the front surface and the axis of rotation.

2. The drill bit assembly of claim 1 wherein the inside surface of each of the first and second cutting vane comprises a first inside surface and a second inside surface, the first and second inside surface comprising the channel.

3. The drill bit assembly of claim 2, wherein said first inside surface of each of said first and second cutting vane is substantially fluted in shape.

4. The drill bit assembly of claim 2, wherein said first inside surface of each of said first and second cutting vane extends at a first angle relative to said second inside surface of said first and second cutting vane, respectively.

5. The drill bit assembly claim 4, wherein said first angles are each an acute angle between 0 degrees and 90 degrees.

6. The drill bit assembly of claim 5, wherein said first angles are each approximately 45 degrees.

7. The drill bit assembly of claim 2, wherein said second inside surface of each of said first and second cutting vane is orientated so as to be substantially parallel to the central longitudinal axis.

8. The drill bit assembly of claim 2, further comprising a raised edge located on said upper surface of each of said first and second cutting vane proximal to said outside surface of said first and second cutting vane, respectively.

9. The drill bit assembly of claim 2, further comprising a plurality of ridges for substantially minimizing the surface area of the outside surfaces contacting the bore surface of the workpiece to, in turn, minimize the friction and heat generated during drilling.

10. The drill bit assembly of claim 2, wherein said ridges protrude from said outside surfaces, and said ridges extend substantially parallel to the axis of rotation.

11. The drill bit assembly of claim 2, wherein the shaft comprises a threaded bore for matingly receiving a threaded neck of the drill bit head.

12. The drill bit cutting head of claim 1, wherein said third angle of both said first and second cutting vanes is approximately 55 degrees.

13. The drill bit assembly of claim 1, further comprising opposing substantially flat surfaces for grasping and rotating said drill bit head about the axis of rotation.

14. The drill bit assembly of claim 1 wherein the drill bit head further comprises a guide point.

15. The drill bit assembly of claim 14 wherein the guide point comprises a seat and the drill bit head comprises an opening for inserting a set screw through the drill bit head and into the seat to prevent the drill bit head from rotating independently from the guide point.

16. The drill bit assembly of claim 1, wherein the inside surfaces of the first cutting vane and the second cutting vane extend at a second acute angle relative to the axis of rotation.

17. A drill bit for cutting a bore into a workpiece, comprising:

a shaft adapted to matingly engage a drilling machine; and a drill bit head connected to one end of the shaft, the drill bit head and the shaft defining an axis of rotation, and the drill bit head comprising a first cutting vane, a second cutting vane, a removable guide point, and opposing surfaces for grasping and rotating the drill bit head about the axis of rotation, wherein the first and second cutting vanes are spaced substantially equidistant about the axis of rotation, the first cutting vane comprising:

an upper surface that extends substantially perpendicular to the axis of rotation;

a lower surface extending outwardly in a direction relative to the axis of rotation;

a front surface extending between the lower surface and the upper surface at a third angle with the axis of rotation, the upper surface and the front surface defining a first cutting edge that is substantially perpendicular to the axis of rotation;

a trailing surface extending between the upper and the lower surface, wherein the trailing surface is opposed to the front surface;

an outside surface extending between the lower surface and the upper surface, wherein the outside surface extends substantially parallel to the axis of rotation, and wherein the front surface and outside surface define a second cutting edge that is substantially parallel to the axis of rotation; and an inside surface defining a channel, wherein the inside surface is located adjacent the front surface and the axis of rotation;

the second cutting vane comprising:

an upper surface that extends substantially perpendicular to the axis of rotation;

a lower surface extending outwardly in a direction relative to the axis of rotation;

a front surface extending between the lower surface and the upper surface at a third angle with the axis of rotation, the upper surface and the front surface defining a first cutting edge that is substantially perpendicular to the axis of rotation;

a trailing surface extending between the upper and the lower surface, wherein the trailing surface is opposed to the front surface;

an outside surface extending between the lower surface and the upper surface, wherein the outside surface extends substantially parallel to the axis of rotation, and wherein the front surface and outside surface define a second cutting edge that is substantially parallel to the axis of rotation; and an inside surface defining a channel, wherein the inside surface is located adjacent the front surface and the axis of rotation.

18. The drill bit of claim 17, wherein said shaft comprises:

a proximal end, said proximal end having a hexagonal cross-section for matingly engaging said shaft with the drilling machine; and a distal end, said distal end having a threaded bore adapted to engage said drill bit head.

19. The drill bit of claim 17, wherein said drill bit head further comprises a flush set screw extending into said drill bit head, and said guide point includes a seat;

said flush set screw extending into said drill bit head and contacting said seat, said drill bit head is substantially prevented from rotating independently from said guide point.

20. The drill bit of claim 17, wherein said guide point comprises a proximal end portion and a distal end portion.

21. The drill bit of claim 20, wherein said distal end portion has a threaded surface terminating in a point.

22. The drill bit of claim 21, wherein the distal end portion has twenty-four threads per inch and a diameter of approximately 0.070 inches at said point, a diameter of approximately 0.180 inches at the midpoint of said distal end portion, and a diameter of approximately 0.160 inches at the location where said guide points enters said cutting head.

23. The drill bit of claim 17, wherein said first cutting edge of each of the first and second cutting vane includes means for removing workpiece material proximal to said guide point.

24. The drill bit of claim 23, wherein said means for removing workpiece material proximal to said guide point comprises at least one raised inside cutting edge for removing workpiece material proximal to said guide point.

25. The drill bit of claim 24, wherein said at least one raised inside cutting edge extends substantially panel to the axis of rotation.

26. The drill bit of claim 24, wherein said means for removing workpiece material proximal to said guide point further comprises at least one curved edge.

27. A drill bit assembly for cutting a bore into a workpiece, comprising:

a shaft; and a drill bit head connected to one end of the shaft, the drill bit head and the shaft defining an axis of rotation, the drill bit head comprising a first cutting vane and a second cutting vane, wherein the first and second cutting vanes are spaced substantially equidistant about the axis of rotation, the first cutting vane comprising:

an upper surface that extends substantially perpendicular to the axis of rotation;

a lower surface extending outwardly in a direction relative to the axis of rotation;

a front surface extending between the lower surface and the upper surface at an third acute angle relative to the axis of rotation, the front surface and the upper surface defining a first cutting edge that is substantially perpendicular to the axis of rotation;

a trailing surface extending between the upper surface and the lower surface, wherein the trailing surface is opposed to the front surface;

an outside surface extending between the lower surface and the upper surface, wherein the outside surface extends substantially parallel to the axis of rotation, and wherein the outside surface and the front surface define a second cutting edge that is substantially parallel to the axis of rotation;

a first inside surface located adjacent the front surface and the axis of rotation; and a second inside surface located adjacent the front surface and the axis of rotation, the first and second inside surface comprising a channel, the first inside surface extends at a first acute angle relative to the second inside surface and a second acute angle relative to the axis of rotation;

the second cutting vane comprising:

an upper surface that extends substantially perpendicular to the axis of rotation;

a lower surface extending outwardly in a direction relative to the axis of rotation;

a front surface extending between the lower surface and the upper surface at a third acute angle relative to the axis of rotation, the front surface and the upper surface defining a first cutting edge that is substantially perpendicular to the axis of rotation;

a trailing surface extending between the upper surface and the lower surface, wherein the trailing surface is opposed to the front surface;

an outside surface extending between the lower surface and the upper surface, wherein the outside surface extends substantially parallel to the axis of rotation, and wherein the outside surface and the front surface define a second cutting edge that is substantially parallel to the axis of rotation;

a first inside surface located adjacent the front surface and the axis of rotation; and a second inside surface located adjacent the front surface and the axis of rotation, the first and second inside surface comprising a channel, the first inside surface extends at a first acute angle relative to the second inside surface and a second acute angle relative to the axis of rotation.

28. The drill bit assembly of claim 27 which further includes a guide point comprising a seat, wherein the drill bit head comprises an opening for inserting a set screw through the drill bit head and into the seat to prevent the drill bit head from rotating independently from the guide point.

29. The drill bit assembly of claim 27, wherein the third acute angles between the front surfaces of the first cutting vane and the second cutting vane and the axis of rotation are approximately 55 degrees.

30. The drill bit assembly of claim 27, wherein the angles between the first and second inside surfaces of the first and second cutting vane are approximately 45 degrees.

31. The drill bit assembly of claim 30, wherein the second acute angle is approximately 45 degrees.

* * * * *